March 1, 1949. J. H. HOLSTEIN 2,463,273
AUTOMATIC TENSIONING MEANS FOR BELT CONVEYERS
Filed June 19, 1946 4 Sheets-Sheet 2

Inventor
John H. Holstein
Clarence F. Poole
Attorney

March 1, 1949.   J. H. HOLSTEIN   2,463,273
AUTOMATIC TENSIONING MEANS FOR BELT CONVEYERS
Filed June 19, 1946   4 Sheets-Sheet 3

Inventor
John H. Holstein
Clarence F. Poole
Attorney

March 1, 1949.  J. H. HOLSTEIN  2,463,273
AUTOMATIC TENSIONING MEANS FOR BELT CONVEYERS
Filed June 19, 1946  4 Sheets-Sheet 4

Fig. 8

Inventor
John H. Holstein
Clarence F. Poole
Attorney

Patented Mar. 1, 1949

2,463,273

UNITED STATES PATENT OFFICE 2,463,273

AUTOMATIC TENSIONING MEANS FOR BELT CONVEYERS

John H. Holstein, Chicago, Ill., assignor to Goodman Manufacturing Company, Chicago, Ill., a corporation of Illinois Application June 19, 1946, Serial No. 677,740

22 Claims. (Cl. 198—208)

1

This invention relates to improvements in belt conveyors, and more particularly relates to improvements in a tension means for maintaining tension on the slack side of the belt for a belt conveyor of the sectional type adapted for use underground in mines.

Sectional belt conveyors of the type used in mines underground usually run from 300 to one or two thousand feet long. When the belt is normally loaded, the pull and load on the upper run of the belt will stretch it and place a relatively high tension thereon, while there will be little, if any, tension on the slack side of the belt. Tension on the lower run or slack side of the belt to compensate for this stretch in the belt, which is about ten per cent of the length of the upper run of the belt, has heretofore been taken up by hand-operated winding drums held by a ratchet, and by gravity take-ups having a weight moving downwardly into a pit. The digging of a pit deep enough to take care of the gravity take-up in mines underground is unduly expensive, especially since the entire conveyor is moved whenever the working place feeding the conveyor is worked out. The hand operated winch is also not effective on account of the human element, and the lack of provisions to take care of the load that is placed on the belt fasteners after the belt has discharged its load, when the tension on the upper and lower runs of the belt tends to become equal.

The principal objects of my invention are to remedy these difficulties by providing a novel form of means for maintaining a predetermined tension on the slack side of the belt of a sectional belt conveyor, both while the conveyor is operating and in a loaded condition and is stationary in an unloaded condition.

A more specific object of my invention is to provide a means for maintaining a predetermined tension on the slack side of the belt of a belt conveyor of the sectional type which includes a tension idler having the lower run of the belt looped therearound, together with an automatically operable power driven means for moving the tension idler in a direction to take up tension on the belt and permitting said tension idler to move in a direction to relieve tension from the belt, when belt tension is above a predetermined value.

A further object of my invention is to provide a winding means driven by a tension idler of the belt conveyor and having a cable wound thereon for moving said tension idler in a direction to maintain tension thereon, together with

2 a novel form of drive and control means therefor, operated by tension on the cable and operable to hold the idler in a predetermined position, and also to permit the belt idler to move in a direction to relieve tension from the belt when the tension thereof exceeds a predetermined value.

These and other objects of my invention will appear from time to time as the following specification proceeds and with reference to the accompanying drawings wherein.

In the drawings, the belt conveyor illustrated may be of a sectional type including a framework consisting of a plurality of transverse supporting standards detachably connected together by suitable spacing members. Said spacing members and standards have belt supporting idlers mounted thereon and form a means for supporting the upper and lower runs of a conveyor belt 10 in a manner somewhat similar to that shown and described in Patent No. 2,373,839, which issued to J. R. Madeira on April 17, 1945, and are not herein shown since they are no part of my present invention. Said spacing members and standards are connected adjacent the discharge end of the conveyor to an intermediate elevating frame 11, to incline the belt upwardly to a discharge position. Said intermediate frame is connected to a drive end frame 12 having an overhanging discharge end 13 with an idler roller 14 journaled therein about which the belt reverses its direction of travel. From said idler roller the belt travels in a forward direction over and around a drive roller 15 and rearwardly therefrom and over and around a drive roller 16. From said drive roller said belt travels forwardly along the lower portion of the frame 12 over an idler 18 mounted at the rear end of the intermediate frame 11 and forwardly therefrom, and is looped around an idler 17, adjacent the forward end of said intermediate frame. Said belt is then looped around a movable tension idler 19 and extends forwardly therefrom along the intermediate frame 11 and over idlers (not shown) supported in the belt supporting standards mentioned before, to and around an idler roller (not shown) at the receiving end of the conveyor.

Figure 1:
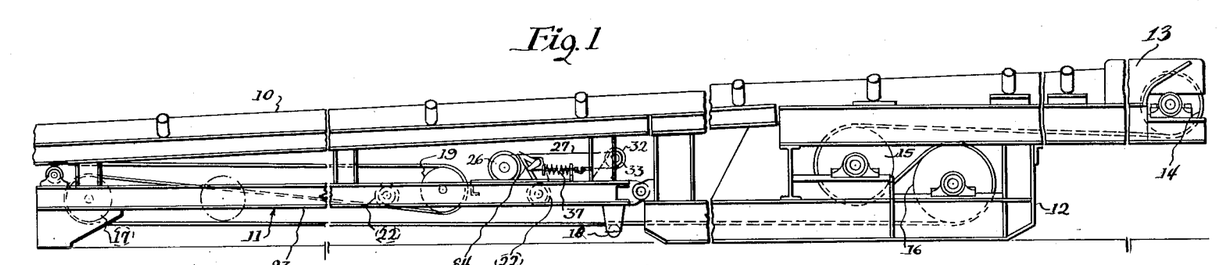
Figure 1 is a view in side elevation of the drive end of a sectional belt conveyor having a take-up means constructed in accordance with my invention emobdied therein.
Figure 2:
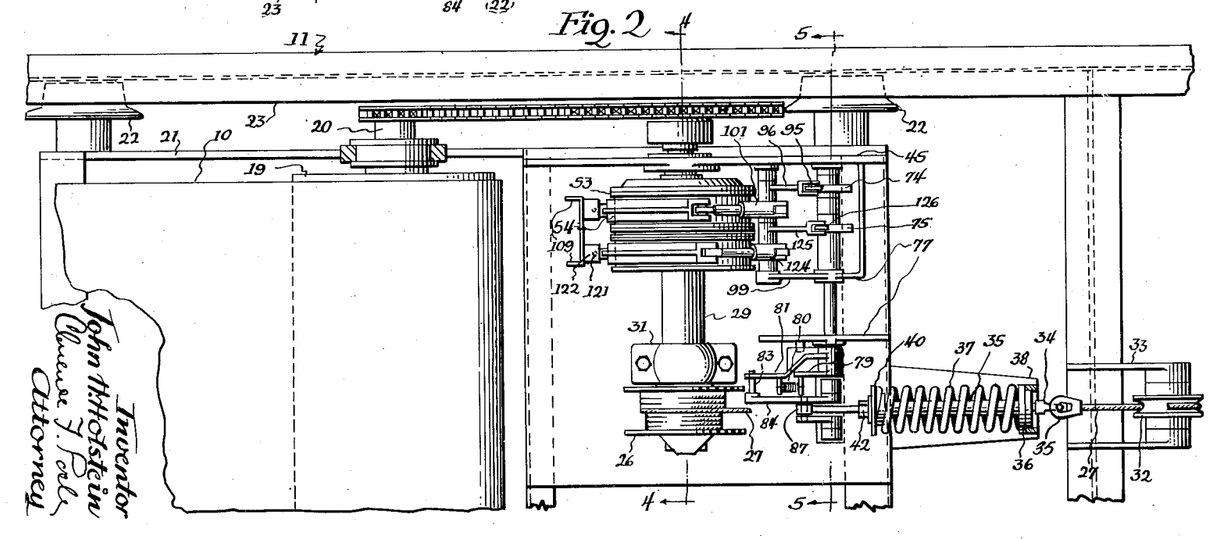
Figure 2 is an enlarged fragmentary plan view with certain parts of the conveyor broken away and certain other parts shown in horizontal section, in order to show certain details of the belt take-up constructed in accordance with my invention.

The tension idler 19 is mounted on a transverse shaft 20 which is journaled in a movable frame 21, as indicated in Figure 2. Said frame is of a rectangular formation having flanged track wheels 22, 22 mounted at its opposite sides adjacent opposite ends thereof. Said track wheels ride on the insides of the lower flanges of I-beams 23, 23, which form side frame members of the intermediate frame 11.

The tension idler 19 and frame 21 are moved in a direction to take up tension on the belt or are permitted to move in a direction to relieve tension from the belt, and are held in fixed relation with respect to the drive rollers 15 and 16 by means of a winding drum 26 having a cable 27 wound thereon. Said winding drum is rotatably mounted on a sleeve 29, which is journaled coaxially of a transverse shaft 30 on a self-aligning roller bearing 31, see also Figures 3 and 6. Said cable is adapted to be trained from said winding drum around a sheave 32, mounted on a bracket 33 extending upwardly from a rear stationary portion of the intermediate frame 11. From said sheave said cable extends in a forward direction and is connected at its free end to a hook 34 threaded on the forward end of an eye-bolt 35. Said eyebolt is slidably mounted in a retaining member 36 for a preloaded spring 37 encircling said eyebolt, and is yieldably connected to the frame 21 through said spring. Said retaining member is mounted in a bracket 38 which extends from a bottom plate 39 of the frame 21 towards the drive rollers 15 and 16. The preloaded spring 37, encircling said eyebolt, is interposed between the retaining member 36 and a retaining member 40 mounted adjacent the opposite end of said eyebolt, on a sleeve 41 encircling and extending along said eyebolt and suitably secured thereto. Lock nuts 42, 42 serve to hold said retaining member on said eyebolt and to adjust the tension of said spring so as to load said spring to the desired extent. It should here be understood that said spring is loaded to the tension desired in the lower run of the belt so that as cable is wound on said winding drum, the frame 21 and tension idler 19 will be moved towards the drive rollers 14 and 15 through said spring until the pull on said spring is such as to compress it to operate a control and holding means for holding said winding drum from rotation, as will hereinafter more clearly appear as this specification proceeds.

Figure 4:
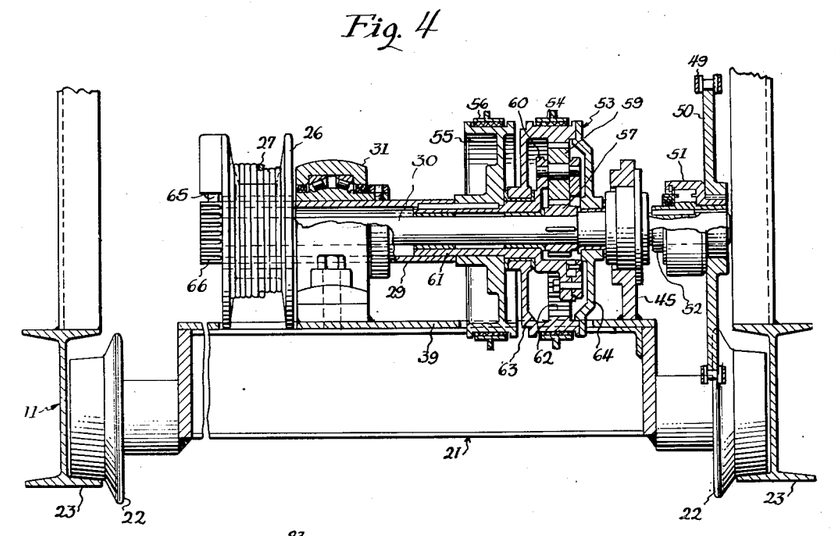
Figure 4 is a transverse sectional view taken substantially along the line 4—4 of Figure 2.
Figure 5:
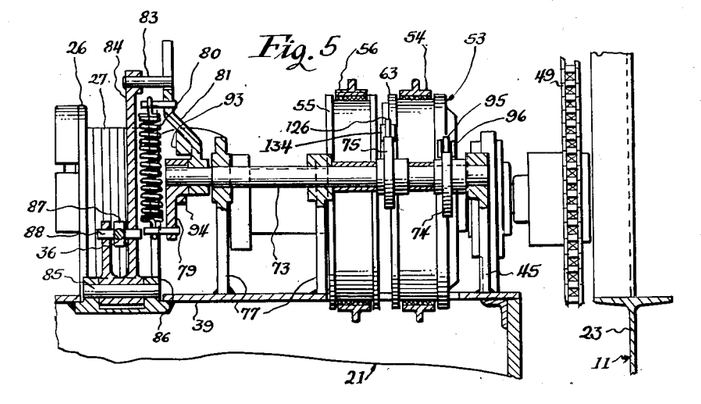
Figure 5 is a transverse sectional view taken substantially along line 5—5 of Figure 2.

The transverse shaft 30 is journaled adjacent one of its ends in a suitable bearing bracket formed in a side plate 45 extending along and upwardly from the plate 39, and is journaled adjacent its opposite end in a bearing 46, mounted within the sleeve 29. Said shaft is driven from the tension idler 19 through a chain and sprocket drive 49. Said chain and sprocket drive includes a sprocket 50 keyed on the hub of a one-way clutch 51, see Figure 4. A driven member 52 of said clutch is keyed on said shaft, for driving said shaft from said sprocket when the belt is moving from its receiving to discharge end, and to prevent driving of said shaft when the direction of said sprocket is reversed, so tension may be held on or released from the belt when its direction of travel is reversed. Said one-way clutch may be of any well known form of free wheeling clutch and may be of the ball type, which is commonly referred to as a one-way ball clutch. A planetary geared reduction device 53 controlled by a friction band 54 is provided to drive the sleeve 29 and said winding drum. A brake drum 55 engaged by a friction band 56 is provided to hold said winding drum from rotation.

The planetary geared reduction device includes a sun gear 57 keyed on the transverse shaft 30 and meshing with a planetary pinion 59 rotatably mounted in a cage 60. Said cage is herein shown as being formed integrally with a sleeve 61, which has the sleeve 29 and the brake drum 55 keyed thereon. The planetary pinion 59 meshes with and drives an internal gear 62, herein shown as being cut on the inner periphery of a casing 63 for said planetary geared reduction mechanism. Said casing is journaled on the sleeve 61 and is closed by an end plate 64 journaled on the shaft 30. The outer periphery of said casing is adapted to be engaged by the friction band 54 for holding said casing from rotation. Said friction band is herein shown as being made up of three pivotally connected sections and said friction band and the means for engaging it with or disengaging it from said casing will hereinafter be more clearly described as this specification proceeds. Said internal gear when held from rotation by said friction band forms a reaction member for said planetary, causing the planetary pinion 59 and cage 60 to move therearound and rotatably drive the sleeve 29 and winding drum 26 at a reduced speed.

Figure 6:
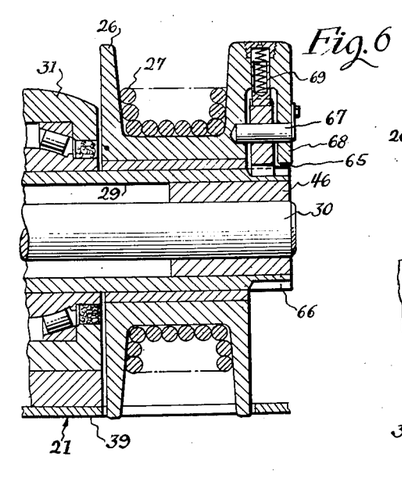
Figure 6 is an enlarged detail fragmentary transverse sectional view taken through the winding drum for the belt take-up.
Figure 7:
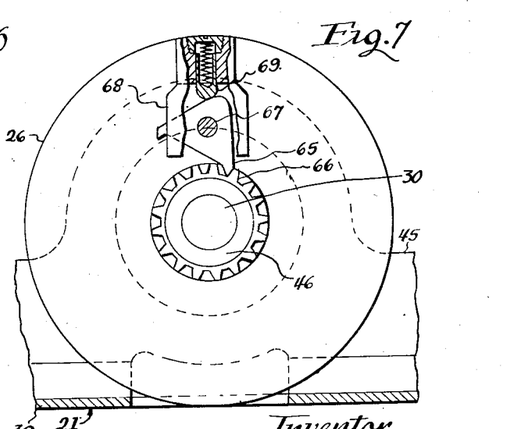
Figure 7 is an end view of the winding drum with certain parts thereof shown in substantially longitudinal section.

A pawl 65, see Figures 6 and 7, engageable with ratchet teeth 66 formed integrally with the outer end of the sleeve 29 is provided to drive the winding drum 26 from said sleeve and to permit said winding drum to be freely rotated, to permit cable to be unwound therefrom when it is desired to extend the conveyor. Said pawl is pivotally mounted on a pivotal pin 67 mounted at its inner end in the flange of said drum and its outer end in a supporting member 68 extending along and spaced from the flange of said drum. Said pawl is urged into engagement with the ratchet teeth 66 by means of a spring pressed plunger 69.

Figure 3:
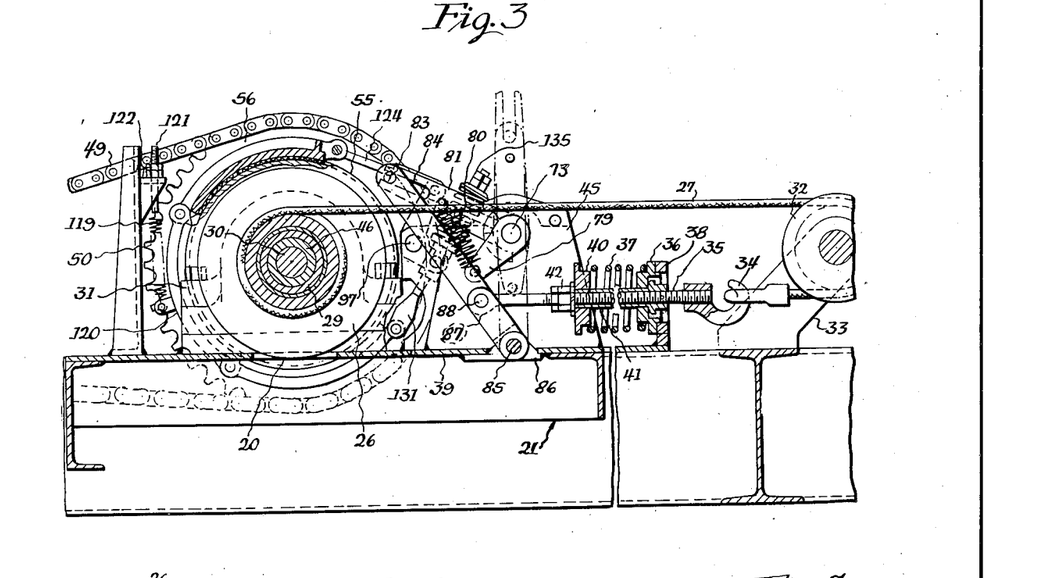
Figure 3 is an enlarged detail view in side elevation of the belt take-up means showing certain parts thereof in substantially longitudinal section.

The control means for the friction bands 54 and 56 includes a cam shaft 73, see Figures 3 and 6, extending parallel to the transverse shaft 30 and having oppositely disposed cams 74 and 75 keyed on said cam shaft so that when the friction band 54 engages the casing 63, the friction band 56 will be disengaged from the brake drum 55 and vice versa. Said cam shaft is pivotally mounted at one of its ends in the side plate 45 and intermediate its ends in bearing supports 77, 77 projecting upwardly from the bottom plate 39. Said cam shaft is operated by a rocking arm 79 keyed to its end adjacent the drum 26 and herein shown as depending from said shaft. Said rocking arm is rocked by means of a tension spring 80 connected at one of its ends to the lower end of said rocking arm, and connected adjacent its opposite end intermediate the ends of an arm 81, mounted on said cam shaft for pivotal movement with respect thereto and extending upwardly therefrom. Said arm is provided with a longitudinally slotted upper end portion opening at its top, which is adapted to be slidably engaged by a pin 83 extending inwardly from the upper end of a lever arm 84. Said lever arm is pivoted adjacent its lower end on the bottom plate 39 on a transverse pin 85. Said pin is herein shown as being mounted at its ends in a support member 86, secured to the underside of said plate and extending therethrough along opposite sides of said lever arm.

Figure 8:
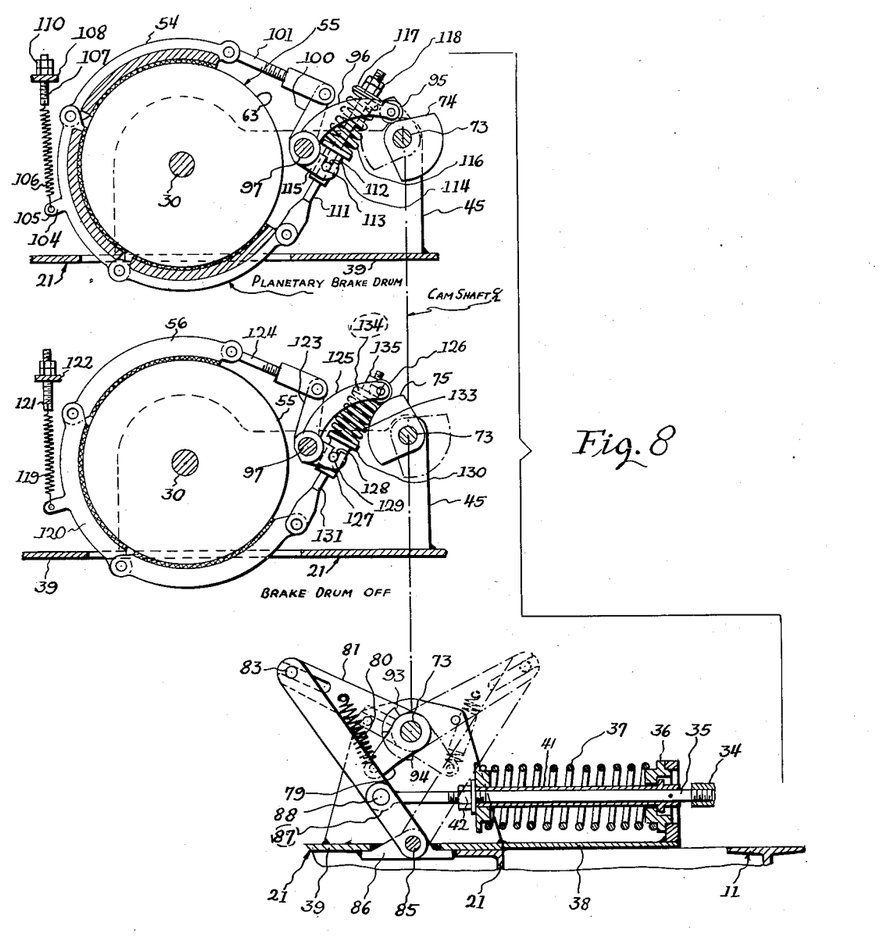
Figure 8 is a diagrammatic view showing certain operative positions of the operating and control means for the take-up device.

The lower portion of the lever arm 84 is forked and has an eye 87 of the eyebolt 35 extending between the furcations thereof and pivotally connected thereto on a pivotal pin 88. A stop 93, see Figure 8, is provided on the outer side of the arm 81, adjacent the rocking arm 79, and is adapted to engage opposite faces of a stop 94 on the inner side of said rocking arm, intermediate its ends, to limit movement of said rocking arm in one direction or another. Thus as the lever arm 84 moves the arm 81 past a dead center position with respect to the rocking arm 79, the spring 80 will instantaneously pivot said arm 79 and the cam shaft 73.

When the spring 37 is in the extended position shown in Figures 3 and 8, the cams 74 and 75 will be in position to release the friction band 56 from its brake drum 55 and permit the friction band 54 to be applied to the casing 63 to hold the internal gear 62 of the planetary 53 from rotation. This will connect the sprocket 50 to drive the sleeve 29 and winding drum 26 in a winding direction through said planetary at a reduced speed, and move the frame 21 and tension idler 19 towards the drive rollers 15 and 16 by means of the cable 27. As the stretch in the belt 10 is taken up by movement of said tension idler towards said drive rollers and as the lower run of the belt is placed under tension, the pull of the cable 27 against said spring 37 will tend to compress said spring, and will compress said spring when its pull is above the preloaded value of said spring. When said spring is compressed, the lever arm 84 will move in a clockwise direction to the position shown by broken lines in Figure 8. This will pivot the cam shaft 73 in a counterclockwise direction through the arm 81, the spring 80, and the rocking arm 79 and will move the cams 74 and 75 to the position shown by broken lines in Figure 8. When said cams are in this position, the friction band 54 will be released from the planetary 53 and the brake band 56 will be applied to the brake drum 55, to hold the winding drum 26 from rotation and hold the tension idler in fixed relation with respect to said drive rollers 15 and 16, until tension on the lower run of the belt increases to an extent sufficient to cause the cable 27 to unwind from said winding drum against said brake band, and relieve tension on the lower run of the belt.

It should here be understood that under normal operating conditions when slack in the belt has once been taken up and tension has been placed on the slack side of the belt, that the friction band 56 will be applied to the brake drum 55 to hold the tension idler in fixed relation with respect to the drive rollers 15 and 16, and that the only time tension on the lower run of the belt increases to the extent necessary to allow said winding drum to unwind against the friction band 56, is when the conveyor has discharged its load or a greater part of its load and is stopped. Since the conveyor belt will stretch elastically as much as 1.50% under load, the removal of such load will cause the belt to contract to its no load length. Since the difference in tension between the driving side and the slack side of a belt is a function of the power or load transmitted thereby, the release of such load will cause the tension in the slack side to become substantially the tension on the upper running or driving side of the belt.

The operating and controlling connections from the cams 74 and 75 to the respective friction bands 54 and 56 are as follows: The cam 74 is adapted to be engaged by a roller 95 on the outer end of a rocking arm 96. Said rocking arm is freely mounted on a transverse shaft 97 mounted at one of its ends in the side plate 45 and at its opposite end in an extension 99 of the support 77, see Figure 2. An upwardly projecting arm 100 is herein shown as being formed integrally with said rocking arm and is connected with the upper end of said friction band through an adjustable link 101. Said friction band has an intermediate section 104 having a lug 105 projecting outwardly therefrom. A tension spring 106 is connected to said lug at its lower end and to the lower end of a threaded rod 107 at its upper end, to hold said friction band lightly in engagement with the outer periphery of the casing 63. Said rod extends through a bracket 108 projecting from an upright leg 109 mounted on and projecting upwardly from the bottom plate 39. A plurality of lock nuts 110 threaded on the upper end of said rod, abut the top of said bracket and form a means to hold said rod to said bracket and to adjust the tension of said spring.

The end of the friction band 54 opposite from the link 101 is pivotally connected to the lower end of a rod 111 which is slidably mounted in a flanged sleeve 112 for movement in the direction of the axis of said sleeve. Said flanged sleeve has trunnion pins 113, 113 projecting laterally from opposite sides thereof which pivotally engage slots 114, 114, opening upwardly from a bifurcated arm 115. Said arm is formed integrally with the rocking arm 96 and projects therefrom towards the cam shaft 73. A compression spring 116 encircles said rod and is interposed between the flange of said flanged sleeve and a collar 117 mounted on the end of said rod opposite from said flanged sleeve. Lock nuts 118, 118 are provided to hold said spring to said rod and to adjust the tension of said spring and load it to the desired extent.

The spring 116, preloaded by adjustment of the nuts 118, 118, thus applies the friction band 54 to the outer periphery of the casing 63 to hold the internal gear 62 from rotation when the roller 95 is on the low side of the cam 74. When said cam is pivotally moved 180° effected by pull of the cable 27 on the spring 37 to the extent sufficient to compress said spring, the roller 95 will ride on the high side of said cam, to release said band from said planetary, and disconnect said winding drum from the drive sprocket 50.

The friction band 56 is of a sectional construction much like the friction band 54 and is held in light engagement with the brake drum 55, by means of a tension spring 119 connected to an intermediate section 120 of said friction band at one of its ends, and connected at its opposite end to a threaded rod 121 adjustably mounted in a bracket 122 projecting from the leg 109, like the threaded rod 107 for the spring 106. Said friction band is connected at its upper end to the upper end of a rocking arm 123 through an adjustable connecting link 124. An arm 125 is formed integrally with said rocking arm and extends therefrom, and has a roller 126 on its end which is adapted to engage the cam 75. An arm 127 is formed integrally with said rocking arm and has laterally spaced upwardly opening slotted portions 128, 128 adapted to be engaged by trunnion pins 129, 129, projecting laterally from opposite sides of a flanged sleeve 130. A rod 131 is pivotally connected to the end of said friction band opposite from the link 124 and is mounted for slidable movement in the sleeve 130. The upper portion of said rod is encircled by a compression spring 133 which is interposed between the flange of said flanged sleeve and a washer 134 held to said rod by lock nuts 135. Said lock nuts besides holding said washer and spring on said rod, also serve to adjust the tension of said spring and to preload said spring to apply said friction band when the roller 126 is on the low part of the cam 75 and to permit said brake drum to slip when the tension of the belt exceeds a predetermined value.

While I have herein shown and described one form in which may invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In combination with a belt conveyor including a belt trained about a drive roller adjacent the discharge end of the conveyor, and means for maintaining a predetermined tension on the slack side of the belt both while the conveyor is operating and stationary including a tension idler having said belt trained therearound, and mounted for movement with respect to said drive roller in a direction to take up said belt or to relieve tension therefrom, and a power driven winding means for moving said tension idler, and means responsive to the tension in the lower run of said belt for controlling said power winding means, said power winding means being operable to move said tension idler in a direction to maintain a predetermined tension on the lower run of said belt.

2. In combination with a belt conveyor including a belt trained about a drive roller adjacent the discharge end of the conveyor, and means for maintaining a predetermined tension on the slack side of the belt both while the conveyor is operating and stationary including a tension idler having said belt trained therearound and mounted for movement with respect to said drive roller, a power driven winding drum having a cable adapted to be wound thereon or payed off therefrom, an operative connection from said cable to said tension idler for moving said tension idler with respect to said drive roller, and drive and control means for said winding drum responsive to the tension in the lower run of said belt, operable to move said tension idler towards said drive roller when the tension on the lower run of said belt is below a predetermined value, and to permit said belt to move said tension idler away from said drive roller when the tension of said belt is above said predetermined value, and to hold said drum from rotation when tension on the lower run of the belt is at said predetermined value.

3. In combination with a belt conveyor including a belt trained about a drive roller adjacent the discharge end of the conveyor, and means for maintaining a predetermined tension on the slack side of the belt both while the conveyor is operating and stationary including a tension idler having said belt trained therearound and mounted for movement with respect to said drive roller, a power driven winding drum having a cable adapted to be wound thereon or payed off therefrom, an operative connection from said cable to said tension idler for moving said tension idler with respect to said drive roller, and drive and control means for said winding drum including a brake for holding said drum from rotation in an unwinding direction, but operable to permit said drum to unwind when the tension on said belt is above a predetermined value, gear reduction means operable to drive said winding drum, and means operable by tension on said belt to release said brake and cause said gear reduction means to drive said drum in a direction to wind cable thereon and move said tension idler towards said drive roller, until tension on said belt reaches a predetermined value.

4. In combination with a belt conveyor including a belt trained about a drive roller adjacent the discharge end of the conveyor, and means for maintaining a predetermined tension on the slack side of the belt both while the conveyor is operating and stationary including a tension idler having said belt trained therearound and mounted for movement with respect to said drive roller, a power driven winding drum, a cable adapted to be wound on or be payed off of said drum, an operative connection from said cable to said tension idler for moving said tension idler with respect to said drive roller, and drive and control means for said winding drum including a brake for holding said drum from rotation in an unwinding direction, but operable to permit said drum to unwind when the tension on said belt is above a predetermined value, gear reduction means operable to drive said winding drum, means operable by tension on said belt to cause said gear reduction means to drive said drum in a direction to wind cable thereon and move said tension idler toward said drive roller until tension on said belt reaches a predetermined value, other means operable to apply said braking means to hold said winding drum from rotation and hold tension on said belt, when tension on the slack side of said belt reaches a predetermined value, and operable to permit said drum to unwind against said braking means and permit said tension idler to move away from said drive roller when tension on the slack side of said belt exceeds said predetermined value.

5. In combination with a belt conveyor including a belt trained about a drive roller adjacent the discharge end of the conveyor, and means for maintaining a predetermined tension on the slack side of the belt both while the conveyor is operating and stationary including a tension idler having said belt trained therearound and mounted for movement with respect to said drive roller in directions to take up said belt or to relieve tension therefrom, a winding drum, a cable adapted to be wound on or payed off of said drum, and having connection with said idler for moving said idler in a direction to take up said belt, planetary gear reduction means for driving said winding drum, a holding means engageable with said planetary gear reduction means for controlling operation thereof, and means operable by tension on said belt to engage said holding means with said planetary gear reduction means, to cause said planetary gear reduction means to drive said drum in a direction to wind cable thereon and to move said tension idler in a direction to take up said belt until tension on said belt reaches a predetermined value.

6. In combination with a belt conveyor including a belt trained about a drive roller adjacent the discharge end of the conveyor, and means for maintaining a predetermined tension on the slack side of the belt both while the conveyor is operating and stationary including a tension idler having said belt trained therearound and mounted for movement with respect to said drive roller in directions to take up said belt or to relieve tension therefrom, a winding drum, a cable adapted to be wound on or payed off of said drum, and having connection with said idler for moving said idler in a direction to take up said belt, planetary gear reduction means for driving said winding drum, holding means engageable with said planetary gear reducton means for controlling operation thereof, and means operable by tension on said belt to engage said holding means with said planetary gear reduction means, to cause said planetary gear reduction means to drive said drum in a direction to wind cable thereon and to move said tension idler towards said drive roller until tension on said belt reaches a predetermined value, said means being operable to apply said brake and release said holding means when tension on the slack side of said belt reaches said predetermined value.

7. In combination with a belt conveyor including a belt trained about a drive roller adjacent the discharge end of the conveyor, and means for maintaining a predetermined tension on the slack side of the belt both while the conveyor is operating and stationary including a tension idler having said belt trained therearound and mounted for movement with respect to said drive roller in a direction to take up said belt or to relieve tension therefrom, a winding drum, a cable adapted to be wound on or payed off of said drum and having connection with said idler for moving said idler in a direction to take up said belt, planetary gear reduction means for driving said winding drum, holding means including a pair of brakes engageable with said planetary gear reduction means for controlling operation thereof, and means operable by tension on said belt to engage said holding means with said planetary gear reduction means, to cause said planetary gear reduction means to drive said drum in a direction to wind cable thereon and to move said tension idler towards said drive roller until tension on said belt reaches a predetermined value, said means being operable to apply one of said brakes and to release the other of said brakes when tension on the slack side of said belt reaches said predetermined value, and including a shaft, a rocking arm on said shaft, a preloaded spring operatively connected with said rocking arm for urging said rocking arm in one direction, and a connection between said cable and said spring for moving said tension idler with respect to said drive roller and for pivoting said rocking arm and shaft in a direction opposite to which it is pivotally moved by said spring.

8. In combination with a belt conveyor including a belt trained about a drive roller adjacent the discharge end of the conveyor, and means for maintaining a predetermined tension on the slack side of the belt both while the conveyor is operating and stationary including a tension idler having said belt trained therearound and mounted for movement with respect to said drive roller in a direction to take up said belt or to relieve tension therefrom, a winding drum, a cable adapted to be wound on or payed off of said drum and having connection with said idler for moving said idler in a direction to take up said belt, planetary gear reduction means for driving said winding drum, holding means including a pair of brakes engageable with said planetary gear reduction means for controlling operation thereof, and means operable by tension on said belt to engage said holding means with said planetary gear reduction means, to cause said planetary gear reduction means to drive said drum in a direction to wind cable thereon and to move said tension idler towards said drive roller until tension on said belt reaches a predetermined value, said means being operable to apply one of said brakes to release the other of said brakes when tension on the slack side of said belt reaches said predetermined value, and including a shaft, a rocking arm on said shaft, a preloaded spring operatively connected with said rocking arm for urging said rocking arm in one direction, a connection between said cable and said spring for moving said tension idler with respect to said drive roller and for pivoting said rocking arm and shaft in a direction opposite to which it is pivotally moved by said spring, and means on said shaft having connection with said holding means and said brake for controlling operation thereof.

9. In combination with a belt conveyor including a belt trained about a drive roller adjacent the discharge end of the conveyor, and means for maintaining a predetermined tension on the slack side of the belt both while the conveyor is operating and stationary including a tension idler having said belt trained therearound and mounted for movement with respect to said drive roller in a direction to take up said belt or to relieve tension therefrom, a winding drum, a cable adapted to be wound on or payed off of said drum and having connection with said idler for moving said idler in a direction to take up said belt, planetary gear reduction means for driving said winding drum, holding means including a pair of brakes, engageable with said planetary gear reduction means for controlling operation thereof, and means operable by tension on said belt to engage said holding means with said planetary gear reduction means, to cause said planetary gear reduction means to drive said drum in a direction to wind cable thereon and to move said tension idler towards said drive roller until tension on said belt reaches a predetermined value, said means being operable to apply one of said brakes and to release the other of said brakes when tension on the slack side of said belt reaches said predetermined value, and including a shaft, a rocking arm on said shaft, a preloaded spring operatively connected with said rocking arm for urging said rocking arm in one direction, a connection between said cable and said spring for moving said tension idler with respect to said drive roller and for pivoting said rocking arm and shaft in a direction opposite to which it is pivotally moved by said spring, including a cam on said shaft for releasing said brake, another cam on said shaft for releasing said holding means from said planetary, a pre-loaded spring for applying said brake upon movement of said associated cam to a released position, a preloaded spring for engaging said holding means with said planetary upon movement of said associated cam to a released position, said cams being oppositely disposed to permit one associated spring to apply said brake upon release of said holding means and said other associated spring to apply said holding means upon release of said brake.

10. In combination with a belt conveyor including a belt trained about a drive roller adjacent the discharge end of the conveyor, and means for maintaining a predetermined tension on said belt including a tension idler having said belt trained therearound and mounted for movement with respect to said drive roller, a winding drum, a cable on said drum operative to move said tension idler towards said drive roller and to hold said tension idler in fixed relation with respect thereto, and a drive connection from said tension idler to said winding drum for driving said winding drum in a winding direction, including drive and control means responsive to the tension in the lower run of said belt operable to drive said drum in a direction to take up said belt when the tension on the lower run of said belt is reduced below a predetermined value, for moving said tension idler in a direction to relieve tension from the lower run of said belt when tension of said belt is above said predetermined value.

11. In combination with a belt conveyor including a belt trained about a drive roller adjacent the discharge end of the conveyor, and means for maintaining a predetermined tension on said belt including a tension idler having said belt trained therearound and mounted for movement with respect to said drive roller, a winding drum, a cable on said drum operative to move said tension idler with respect to said drive roller and to hold said drive roller in fixed relation with respect thereto, and a drive connection from said tension idler to said winding drum for driving said winding drum in a winding direction, including drive gearing and control means therefor operable by tension on said cable to cause said gearing to drive said drum in a direction to take up said belt when tension on the slack side of said belt is reduced below a predetermined value, and means for holding said winding drum from rotation and for holding said tension idler in fixed relation with respect to said drive roller, and for releasing said drum for rotation in an unwinding direction when tension on said belt exceeds said predetermined value, to permit said tension idler to move away from said drive roller and relieve tension from said belt.

12. In combination with a belt conveyor including a belt trained about a drive roller adjacent the discharge end of the conveyor, and means for maintaining a predetermined tension on the slack side of the belt both while the conveyor is operating and stationary, including a tension idler having said belt trained therearound and mounted for movement towards or from said drive roller, a winding drum, a cable on said drum operative to move said tension idler towards said drive roller and to hold said drive roller in fixed relation with respect thereto, a geared drive connection from said tension idler for driving said drum in a winding direction, braking means for holding said winding drum from rotation and for releasing said winding drum for rotation in an unwinding direction, and separate control means for said drive gearing and said brake means and operable by tension on said cable to cause said drive gearing to drive said drum in a direction to wind cable thereon and move said tension idler towards said drive roller when tension on the lower run of said belt is below a predetermined value, and to cause said braking means to hold said winding drum from rotation when tension on the lower run of said belt reaches said predetermined value and to release said tension idler for movement away from said drive roller when tension on said belt exceeds a predetermined value.

13. In combination with a belt conveyor including a belt trained about a drive roller adjacent the discharge end of the conveyor, and means for maintaining a predetermined tension on the slack side of the belt both while the conveyor is operating and stationary, including a tension idler having said belt trained therearound and mounted for movement with respect to said drive roller, a winding drum, a cable on said drum operative to move said tension idler towards said drive roller and to hold said drive roller in fixed relation with respect thereto, a geared drive connection from said tension idler for driving said drum in a winding direction, braking means for holding said winding drum from rotation and for releasing said winding drum for rotation in an unwinding direction, and separate control means for said drive gearing and said brake means and operable by tension on said cable to cause said drive gearing to drive said drum in a direction to wind cable thereon and move said tension idler towards said drive roller when tension on the lower run of said belt is below a predetermined value, and to cause said braking means to hold said winding drum from rotation when tension on the lower run of said belt reaches a predetermined value, and to release said tension idler for movement away from said drive roller when tension on said belt exceeds a predetermined value, said control means including a preloaded spring operatively connected with said cable, and operative connections from said spring to said gearing, to cause said gearing to drive said drum when the tension of said spring is reduced below said predetermined value and to apply said brake when tension of said spring reaches said predetermined value.

14. In combination with a belt conveyor including a belt trained about a drive roller adjacent the discharge end of the conveyor, and means for maintaining a predetermined tension on said belt including a tension idler having said belt trained therearound and mounted for movement with respect to said drive roller, a winding drum, a cable on said drum operative to move said tension idler towards said drive roller and to hold said drive roller in fixed relation with respect thereto, planetary drive gearing, a drive connection from said tension idler to said drive gearing for driving said drum in a winding direction, holding means for controlling operation of said planetary drive gearing, braking means for holding said drum from rotation and for releasing said drum for rotation in an unwinding direction, and permitting said tension idler for movement in a direction to relieve tension from the lower run of said belt, when tension of said belt is above said predetermined value, and control means for said holding means and said braking means operable by tension on said belt including a preloaded spring connected with said cable, and also having connection with said tension idler for moving said idler with respect to said drive roller upon winding in of said cable.

15. In combination with a belt conveyor including a belt trained about a drive roller adjacent the discharge end of the conveyor, and means for maintaining a predetermined tension on said belt including a tension idler having said belt trained therearound and mounted for movement with respect to said drive roller, a winding drum, a cable on said drum operative to move said tension idler towards said drive roller and to hold said tension idler in fixed relation with respect thereto, planetary drive gearing, a drive connection from said tension idler to said drive gearing, for driving said drum in a winding direction, holding means for controlling operation of said planetary drive gearing, braking means for holding said drum from rotation and for redirection, for releasing said tension idler for movement in a direction to relieve tension from the lower run of said belt, when tension of said belt is above said predetermined value, and control means for said holding means and said braking means operable by tension on said belt including a preloaded spring connected with said cable, and also having connection with said tension idler for moving said idler with respect to said drive roller upon winding in of said cable, and another connection between said preloaded spring and said control means operable by compression of said spring effected by tension of said cable to operate said control means to apply said braking means and release said holding means when tension on said cable reaches a predetermined value, and operable by extension of said spring to operate said control means to release said braking means and apply said holding means when tension on said cable is reduced below said predetermined value.

16. In combination with a belt conveyor including a belt trained about a drive roller adjacent the discharge end of the conveyor, and means for maintaining a predetermined tension on said belt including a tension idler having said belt trained therearound and mounted for movement with respect to said drive roller, a winding drum, a cable on said drum operative to move said tension idler towards said drive roller and to hold said tension idler in fixed relation with respect thereto, planetary drive gearing, a drive connection from said tension idler to said drive gearing, for driving said drum in a winding direction, holding means for controlling operation of said planetary drive gearing, braking means for holding said drum from rotation and for releasing said drum for rotation in an unwinding direction, for releasing said tension idler for movement in a direction to relieve tension from the lower run of said belt, when tension of said belt is above said predetermined value, and control means for said holding means and said braking means operable by tension on said belt including a preloaded spring connected with said cable, and also having connection with said tension idler for moving said idler with respect to said drive roller upon winding in of said cable, and another connection between said preloaded spring and said control means operable by compression of said spring effected by tension of said cable, to operate said control means to apply said braking means and release said holding means when tension on said cable reaches a predetermined value, and operable by extension of said spring to operate said control means to release said braking means and apply said holding means, when tension on said cable is reduced below said predetermined value, said last mentioned connection including a rocking shaft, a lever arm on said shaft, a connection from said spring to said lever arm for pivotally moving said lever arm and shaft in one direction upon compression of said spring by pull on said cable, and for pivotally moving said lever arm and shaft in an opposite direction upon extension of said spring, and operative connections between said shaft and said braking means for applying said holding means and releasing said braking means when said shaft pivots in one direction and for releasing said holding means and applying said braking means when said shaft pivots in an opposite direction.

17. In combination with a belt conveyor including a belt trained about a drive roller adjacent the discharge end of the conveyor, and means for maintaining a predetermined tension on said belt including a tension idler having said belt trained therearound and mounted for movement with respect to said drive roller, a winding drum, a cable on said drum operative to move said tension idler towards said drive roller and to hold said tension idler in fixed relation with respect thereto, planetary drive gearing, a drive connection from said tension idler to said drive gearing, for driving said drum in a winding direction, holding means for controlling operation of said planetary drive gearing, braking means for holding said drum from rotation and permitting said drum to rotate in an unwinding direction, and for releasing said tension idler for movement in a direction to relieve tension from the lower run of said belt, when tension of said belt is above said predetermined value, and control means for said holding means and said braking means operable by tension on said belt including a preloaded spring connected with said cable, and also having connection with said tension idler for moving said idler with respect to said drive roller upon winding in of said cable, and another connection between said preloaded spring and said control means for permitting tension of said cable to operate said control means to apply said braking means and release said holding means, and permitting said spring to operate said control means to release said braking means and apply said holding means when tension on said cable is reduced below said predetermined value, including a cam on said shaft having operative connection with said holding means for releasing said holding means, and another cam on said shaft having operative connection with said braking means for releasing said braking means, said cams being oppositely disposed to release said holding means upon the applying of said braking means, and vice versa.

18. In combination with a belt conveyor including a belt trained about a drive roller adjacent the discharge end of the conveyor, and means for maintaining a predetermined tension on said belt including a tension idler having said belt trained therearound and mounted for movement with respect to said drive roller, a winding drum, a cable on said drum operative to move said tension idler towards said drive roller and to hold said tension idler in fixed relation with respect thereto, planetary drive gearing, a drive connection from said tension idler to said drive gearing, for driving said drum in a winding direction, holding means for controlling operation of said planetary drive gearing, braking means for holding said drum from rotation and for releasing said drum for rotation in an unwinding direction, and for releasing said tension idler for movement in a direction to relieve tension from the lower run of said belt, when tension of said belt is above said predetermined value, and control means for said holding means and said braking means operable by tension on said belt, including a preloaded spring connected with said cable, and also having connection with said tension idler for moving said idler with respect to said drive roller upon winding in of said cable, and another connection between said preloaded spring and said control means for permitting tension of said cable to operate said control means to apply said braking means and release said holding means, and permitting said spring to operate said control means to release said braking means and apply said holding means when tension on said cable is reduced below said predetermined value, including two oppositely disposed cams on said shaft and operative connections between said cams and said holding means and said braking means, said operative connections including a preloaded spring for applying said holding means upon movement of said associated cam to a released position and another preloaded spring for applying said braking means upon movement of said associated cam to a released position.

19. In a belt conveyor including a belt trained around a drive roller, means for maintaining a predetermined tension on said belt including a tension idler having said belt trained therearound and mounted for movement with respect to said drive roller in a direction to take up said belt or to relieve tension thereon, a winding drum having a cable operatively connected to said tension idler adapted to be wound thereon or payed therefrom, power means for driving said drum in a direction to wind cable thereon and move said tension idler in a direction to take up said belt, and means responsive to the tension in the slack side of said belt for controlling the power means to drive said drum in a direction to wind cable thereon and move said tension idler in a direction to take up said belt and for controlling said power means to pay off cable from said drum to move said tension idler in a direction to relieve tension on said belt.

20. In a belt conveyor including a belt trained around a drive roller, means for maintaining a predetermined tension on said belt including a tension idler having said belt trained therearound and mounted for movement with respect to said drive roller in a direction to take up said belt or to relieve tension thereon, a winding drum having a cable operatively connected to said tension idler adapted to be wound thereon or payed therefrom, power means for driving said drum in a direction to wind cable thereon and move said tension idler in a direction to take up said belt when the tension on said belt is below a predetermined amount, and means responsive to the tension in the slack side of said belt for controlling the power means to drive said drum in a direction to wind cable thereon and move said tension idler in a direction to take up said belt and for controlling said power means to pay off cable from said drum to move said tension idler in a direction to relieve tension on said belt when the tension on said belt is above a predetermined value.

21. In a belt conveyor including a belt trained around a drive roller, means for maintaining a predetermined tension on said belt including a tension idler having said belt trained therearound and mounted for movement with respect to said drive roller in a direction to take up said belt or to relieve tension thereon, a winding drum having a cable operatively connected to said tension idler adapted to be wound thereon or payed therefrom, power means for driving said drum in a direction to wind cable thereon and move said tension idler in a direction to take up said belt, and means responsive to the tension in said belt for controlling the power means to drive said drum in a direction to wind cable thereon and move said tension idler in a direction to take up said belt and for controlling said power means to pay off cable from said drum to move said tension idler in a direction to relieve tension on said belt.

22. In a belt conveyor including a belt trained around a drive roller, means for maintaining a predetermined tension on said belt including a tension idler having said belt trained therearound and mounted for movement with respect to said drive roller in a direction to take up said belt or to relieve tension thereon, a winding drum having a cable operatively connected to said tension idler adapted to be wound thereon or payed therefrom, power means for driving said drum in a direction to wind cable thereon and move said tension idler in a direction to take up said belt when the tension on said belt is below a predetermined amount, and means responsive to the tension in said belt for controlling the power means to drive said drum in a direction to wind cable thereon and move said tension idler in a direction to take up said belt and for controlling said power means to pay off cable from said drum to move said tension idler in a direction to relieve tension on said belt when the tension on said belt is above a predetermined value.

JOHN H. HOLSTEIN.

REFERENCES CITED

The following references are of record in the file of this patent:

FOREIGN PATENTS

| Number | Country | Date |
|---|---|---|
| 672,954 | Germany | Mar. 17, 1939 |

Certificate of Correction

Patent No. 2,463,273.

March 1, 1949.

JOHN H. HOLSTEIN

It is hereby certified that errors appear in the printed specification of the above numbered patent requiring correction as follows:

Column 10, line 20, claim 8, after "brakes" insert *and*; column 13, line 18, claim 15, after the syllable and hyphen "re-" insert *leasing said drum for rotation in an unwinding*;

and that the said Letters Patent should be read with these corrections therein that the same may conform to the record of the case in the Patent Office.

Signed and sealed this 5th day of July, A. D. 1949.

[SEAL]

THOMAS F. MURPHY,
*Assistant Commissioner of Patents.*